United States Patent
Park et al.

(10) Patent No.: US 9,967,702 B2
(45) Date of Patent: May 8, 2018

(54) METHOD OF MANAGING APPLICATION AND ELECTRONIC DEVICE THEREFOR

(71) Applicant: Samsung Electronics Co., Ltd., Suwon-si, Gyeonggi-do (KR)

(72) Inventors: Hyun-Woo Park, Seongnam-si (KR); Dae-Yong Son, Suwon-si (KR); Jae-Woong Song, Suwon-si (KR); Chang-Ryeol Song, Suwon-si (KR); Woo-Jin Jun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/181,850

(22) Filed: Jun. 14, 2016

(65) Prior Publication Data
US 2017/0048661 A1 Feb. 16, 2017

(30) Foreign Application Priority Data
Aug. 12, 2015 (KR) .......................... 10-2015-0114132

(51) Int. Cl.
*H04W 4/02* (2009.01)
*H04W 88/02* (2009.01)
(Continued)

(52) U.S. Cl.
CPC ............. *H04W 4/02* (2013.01); *G06F 9/5011* (2013.01); *H04M 1/72569* (2013.01); *H04W 88/02* (2013.01)

(58) Field of Classification Search
CPC ... H04W 4/02; H04W 88/02; H04M 1/72569; G06F 9/5011
(Continued)

(56) References Cited

U.S. PATENT DOCUMENTS 8,935,755 B1 * 1/2015 Kay .......................... G06F 8/61
726/1
2003/0078053 A1 * 4/2003 Abtin ...................... H04W 8/16
455/456.1
(Continued)

FOREIGN PATENT DOCUMENTS

KR 10-2012-0084184 A 7/2012
KR 10-2014-0051667 A 5/2014

OTHER PUBLICATIONS

Stephen Rhee, What's New in Core Location, Dec. 31, 2014, XP055327912, Retrieved from the Internet: URL:http://devstreaming.apple.com/videos/wwdc/2014/706xxjytntg51wd/706/706_whats_new_in_core_location.pdf.
(Continued)

*Primary Examiner* — Michael Mapa
(74) *Attorney, Agent, or Firm* — Jefferson IP Law, LLP

(57) ABSTRACT

An electronic device for managing one or more applications is provided. The electronic device includes a display, a location measurement module, a communication interface, a memory configured to store a first application program and a second application program, and a processor, electrically connected to the display, the location measurement module, the communication interface, and the memory, configured to execute the first application program, acquire a location information request from the first application program, and determine whether to respond to the location information request at least partially based on a state of the display or information related to the first application program when the instructions are executed.

9 Claims, 14 Drawing Sheets

(51) Int. Cl.
*H04M 1/725* (2006.01)
*G06F 9/50* (2006.01)

(58) Field of Classification Search
USPC ......... 455/343.1–343.5, 404.2, 414.1–414.2, 455/418–420, 456.1–457, 574, 455/343.1–343.5
See application file for complete search history.

(56) References Cited

U.S. PATENT DOCUMENTS

| | | | | |
|---|---|---|---|---|
| 2010/0277367 | A1* | 11/2010 | Dicke | G01S 19/34 342/357.74 |
| 2011/0145920 | A1* | 6/2011 | Mahaffey | G06F 21/564 726/22 |
| 2013/0244686 | A1* | 9/2013 | Saha | G06F 1/3206 455/456.1 |
| 2013/0288718 | A1* | 10/2013 | MacGougan | H04W 52/0254 455/456.4 |
| 2013/0344859 | A1* | 12/2013 | Abramson | G06Q 50/265 455/418 |
| 2014/0370909 | A1* | 12/2014 | Natucci, Jr. | H04W 52/0251 455/456.1 |
| 2015/0163654 | A1* | 6/2015 | Lew | H04W 4/22 455/404.2 |
| 2015/0327015 | A1* | 11/2015 | So | H04W 4/022 455/457 |

OTHER PUBLICATIONS iOS 7: Understanding Location Services—Apple Support, Nov. 20, 2014, XP055327743, Retrieved from the Internet: URL:https://web.archive.org/web/20141120191820/http://support.apple.com/en-us/HT201357.

* cited by examiner

METHOD OF MANAGING APPLICATION AND ELECTRONIC DEVICE THEREFOR

CROSS-REFERENCE TO RELATED APPLICATION(S)

This application claims the benefit under 35 U.S.C. § 119(a) of a Korean patent application filed on Aug. 12, 2015 in the Korean Intellectual Property Office and assigned Serial number 10-2015-0114132, the entire disclosure of which is hereby incorporated by reference.

TECHNICAL FIELD

The present disclosure relates to a method for managing one or more applications to control the use of resources in an electronic device. More particularly, the present disclosure relates to a method for managing one or more applications that make a request for location information even in a state where the one or more applications are executed in the background or a display of the electronic device is turned off, and an electronic device for the same.

BACKGROUND

An electronic device can measure a location through a method, such as a global navigation satellite system (GNSS) or a network location provider (NLP). For example, when an application (for example, map application or a game application) requires location information, the electronic device may measure a location of the electronic device by using at least one method of the GNSS and the NLP.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for managing one or more applications that make a request for location information even in a state where the one or more applications are executed in the background or a display of the electronic device is turned off, and an electronic device for the same.

After making a request for location information through at least one method of a global navigation satellite system (GNSS) and an network location provider (NLP), an application executed in an electronic device may continuously make the request for the location information even in a state where the corresponding application is executed in the background or a display of the electronic device is turned off, and thus generate power consumption of the electronic device.

In accordance with an aspect of the present disclosure, an electronic device for managing one or more applications is provided. The electronic device includes a display, a location measurement module, a communication interface, a memory configured to store a first application program and a second application program, and a processor, electrically connected to the display, the location measurement module, the communication interface, and the memory, configured to execute the first application program, acquire a location information request from the first application program, and determine whether to respond to the location information request at least partially based on a state of the display or information related to the first application program when the instructions are executed.

In accordance with another aspect of the present disclosure, a method for managing one or more applications of an electronic device is provided. The method includes executing a first application program, acquiring a location information request from the first application program, determining whether to respond to the location information request at least partially based on a state of the display or information related to the first application program.

In accordance with another aspect of the present disclosure, a computer-readable recording medium having a program recorded therein to perform a method of managing an application by an electronic device is provided. The method includes executing a first application program, acquiring a location information request from the first application program, determining whether to respond to the location information request at least partially based on a state of the display or information related to the first application program.

A method for managing one or more applications and an electronic device for the same according to various embodiments of the present disclosure can reduce power consumption of the electronic device due to unnecessary location measurement by managing one or more applications that make a request for location information even in a particular state where the one or more applications are executed in the background or a display of the electronic device is turned off.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
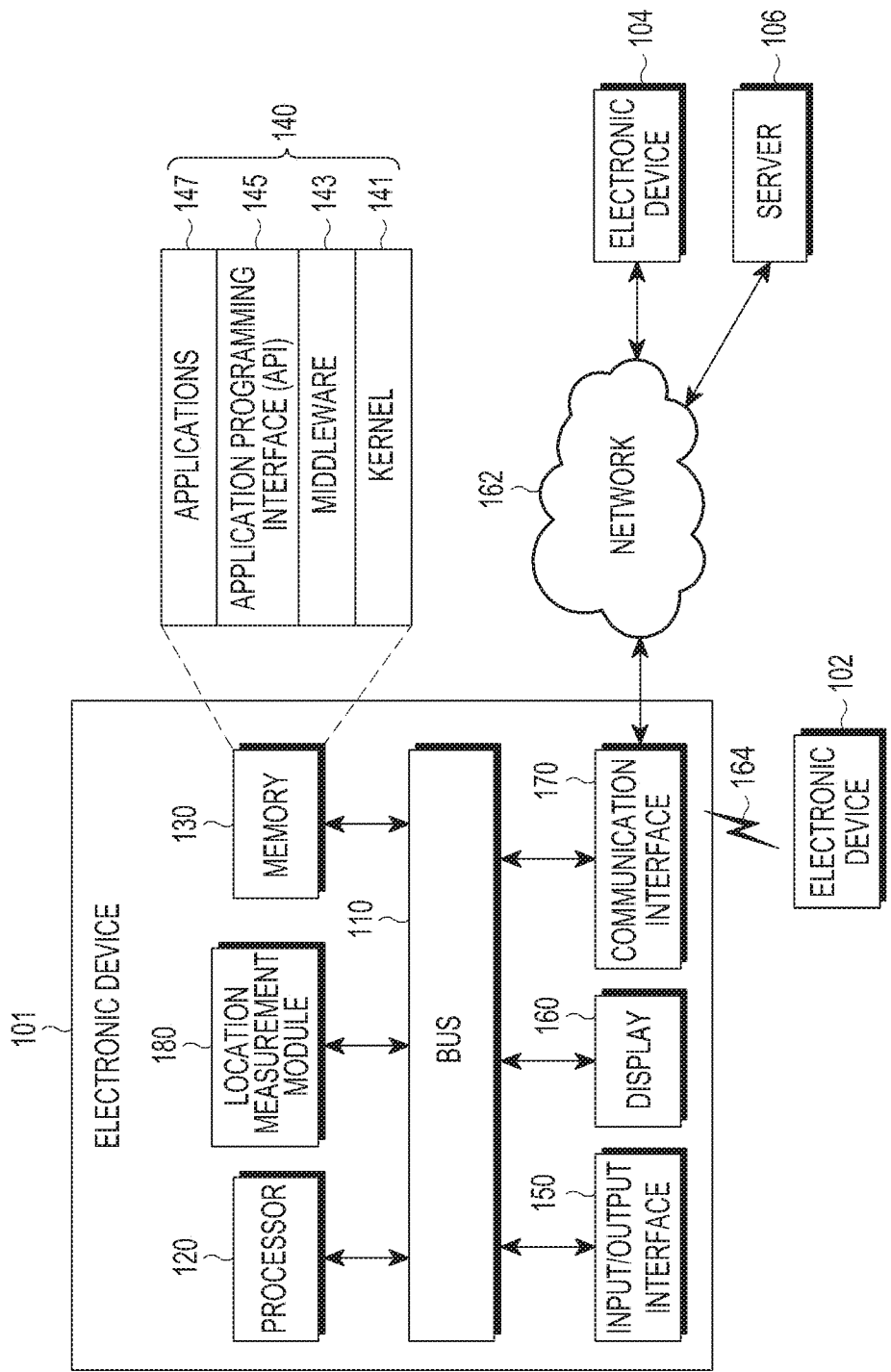
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In an embodiment of the present disclosure, the expression "have", "may have", "include" or "may include" refers to existence of a corresponding feature (e.g., numerical value, function, operation, or components, such as elements), and does not exclude existence of additional features.

In an embodiment of the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/ to or connected to" another element (e.g., a second element), it should be construed that the one element is directly connected to the another element or the one element is indirectly connected to the another element via yet another element (e.g., a third element). Conversely, when one component element is "directly coupled" or "directly connected" to another component element, it may be construed that a third component element does not exist between the first component element and the second component element.

The expression "configured to" used in an embodiment of the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in an embodiment of the present disclosure. In some cases, even the term defined in an embodiment of the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television (TV), a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, and the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, and the like).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to an embodiment of the present disclosure.

Referring to FIG. 1, an electronic device 101 within a network environment, according to various embodiments, will be described with reference to FIG. 1.

The electronic device 101 may include a bus 110, a processor 120, a memory 130, an input/output interface 150, a display 160, a communication interface 170, and a location measurement module 180. In some embodiments, the electronic device 101 may omit at least one of the above elements or additionally include other elements.

The bus 110 may include, for example, a circuit for connecting the elements 120 to 180 and transferring communication (for example, control messages and/or data) between the elements.

The processor 120 may include one or more of a CPU, an AP, and a communication processor (CP). The processor 120 may carry out, for example, operations or data processing relating to control and/or communication of one or more other elements of the electronic device 101.

According to an embodiment, in order to determine whether applications abnormally operate, the processor 120 may monitor the applications in real time. When at least one of the applications abnormally operates, the processor 120 may stop or end the execution of the corresponding application. For example, the processor 120 may temporarily stop the execution of the application by not allocating resources required for the operation of the corresponding application, ending the application, or not transferring service data (for example, GPS information, network location provider (NLP) information, and the like) periodically required by the application.

According to an embodiment, based on a list of applications (hereinafter, referred to as an application list) which can be executed in the electronic device 101, the processor 120 may manage each of the applications registered in the application list. The application list may be a list for limiting the execution of the corresponding application or a list for preferentially executing the corresponding application. The list for limiting the execution of the application may be a list of applications which abnormally operate. The application list may include names of the applications, the type of service module (for example, global navigation satellite system (GNSS) module, NLP module, and the like), which requires the corresponding application, description of the abnormal operation of the corresponding application, and an amount of resources allocated to the corresponding application.

According to an embodiment, the processor 120 may generate the application list. The processor 120 may determine one or more applications which abnormally operate, such as activating a preset number or more of sessions within a preset time or activating sessions for a predefined time or longer, and generate the application list, for example, the list for limiting the execution of the corresponding application based on the one or more determined applications. According to another embodiment, the electronic device 101 may receive the application list from a server (for example, a server 106) or another electronic device (for example, the electronic device 102 or 104) through the communication interface 170.

According to an embodiment, the processor 120 may control areas of the memory 130 to which sessions of each application are allocated, that is, allocation of resources. The processor 120 may limit resource allocation to applications registered in the application list. For example, when a user input is not made into the electronic device 101 for a preset time or longer or when the electronic device 101 enters a sleep mode, the processor 120 may not allocate resources to the applications registered in the application list. For example, when the application registered in the application list is executed in the background, the processor 120 may not allocate resources to the corresponding application. As described above, by not allocating the resources, the processor 120 may temporarily stop or end the execution of the applications registered in the application list.

According to an embodiment, the execution of the application in the background may mean that an execution screen provided by the application is not displayed through the display 160 of the electronic device 101. Further, the execution of the application in the foreground may mean that the execution screen provided by the application is currently displayed through the display 160 of the electronic device 101.

According to an embodiment, the processor 120 may preferentially allocate resources to the applications registered in the application list. For example, when a user input is not made into the electronic device 101 for a preset time or longer or when the electronic device 101 enters a sleep mode, the processor 120 may preferentially allocate resources to the applications registered in the application list. For example, even though the application registered in the application list is executed in the background, the processor 120 may preferentially allocate resources to the corresponding application. As described above, by preferentially allocating the resources, the processor 120 may control the electronic device 101 to smoothly execute the corresponding application.

According to an embodiment, the processor 120 may monitor applications executed in the electronic device 101 in real time. The processor 120 may monitor an amount of resources allocated to each of the executed application or a number of calls of a service module (for example, the GNSS module, the NLP module, and the like) called by each of the applications.

According to an embodiment, the processor 120 may generate a monitoring list of the executed applications in real time. The processor 120 may determine whether there are applications registered in the application list among the executed applications in real time. When there is an application, which is registered in the application list, among the executed applications, the processor 120 may register only the application, which is registered in the application list, in the monitoring list and monitor the application in real time.

According to an embodiment, the processor 120 may determine whether an event for limiting resource allocation to the application, which is registered in the application list, is generated in the electronic device 101. For example, when the display 160 is turned off, the processor 120 may limit the resource allocation to the applications registered in the application list. For example, when the applications, which are registered in the application list, are executed in the background, the processor 120 may limit the resource allocation to the applications.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or an application program (or application) 147. At least some of the kernel 141, the middleware 143, and the API 145 may be referred to as an operating system (OS).

According to an embodiment, the processor 120 may allocate areas of the memory 130 to which sessions of each application are allocated, that is, resources to each of the applications.

The kernel 141 may control or manage system resources (for example, the bus 110, the processor 120, or the memory 130) used for performing an operation or function implemented by the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, and the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer instructions or data input from a user or another external device to the other element(s) of the electronic device 101. In addition, the input/output interface 150 may output instructions or data received from other element(s) of the electronic device 101 to the user or another external device.

According to an embodiment, the input/output interface 150 may receive a user input for allowing the processor 120 to manage applications according to the application list. When the user input is made, the processor 120 may control an amount of resources allocated to each application by limiting the resource allocation or preferentially allocating the resources according to the application list. Further, the processor 120 may determine whether to transfer service data (for example, GPS information or NLP information) required by each of the applications to the corresponding application according to the user input.

The display 160 may include, for example, a liquid crystal display (LCD), a light emitting diode (LED) display, an organic LED (OLED) display, a micro electro mechanical system (MEMS) display, or an electronic paper display. The display 160 may display, for example, various types of contents (for example, text, images, videos, icons, or symbols) for the user. The display 160 may include a touch screen and receive, for example, a touch, gesture, proximity, or hovering input using an electronic pen or the user's body part.

According to an embodiment, the display 160 may display a screen provided by each of the executed applications. According to an embodiment, the display 160 may display an execution screen provided by each of the executed applications. Further, the display 160 may display that the resources allocated to each application by the processor 120 are managed. For example, when it is assumed that 500 MBs of resources are saved by the processor 120 while the electronic device 101 operates in the sleep mode, the display 160 may display a notification for informing of the memory saving of 500 Mbyte after the sleep mode is released.

The communication interface 170 may set communication between, for example, the electronic device 101 and an external device (for example, the first external electronic device 102, the second external electronic device 104, or the server 106). For example, the communication interface 170 may be connected to a network 162 through wireless or wired communication to communicate with the external device (for example, the second external electronic device 104 or the server 106).

According to an embodiment, the communication interface 170 may receive an application list from a server (for example, the server 106) or another electronic device (for example, the electronic device 102 or 104). Further, the communication interface 170 may transmit (or broadcast) an application generated or updated by the processor 120 to the server or the other electronic device.

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short-range communication 164. The short range communication 164 may include at least one of, for example, Wi-Fi, Bluetooth (BT), near field communication (NFC), and GNSS. The GNSS may include at least one of, for example, a GPS, a Global navigation satellite system (Glonass), a Beidou navigation satellite system (hereinafter, referred to as "Beidou"), and Galileo (European global satellite-based navigation system) according to an area in which the GNSS is used or a bandwidth of the GNSS. Hereinafter, in an embodiment of the present disclosure, the term "GPS" may be interchangeably used with the term "GNSS". The wired communication may include at least one of, for example, a universal serial bus (USB), a high definition multimedia interface (HDMI), recommended standard 232 (RS-232), and a plain old telephone service (POTS). The network 162 may include at least one of communication networks, such as a computer network (for example, a local area network (LAN) or a wide area network (WAN), the Internet, and a telephone network.

The location measurement module 180 may measure a current location of the electronic device 101. According to an embodiment, the location measurement module 180 may be implemented to include the GNSS module, and may generate and transfer GPS information indicating a location of the electronic device 101 (for example, a GPS coordinate) according to a request of the application 147 every predefined time (for example, every 0.5 seconds). According to an embodiment, the location measurement module 180 may be implemented to include the NLP module, and may generate and transfer Global NLP (GNLP) information indicating a location of the electronic device 101 (for example, cell information and Wi-Fi information) according to a request of the application 147 every predefined time (for example, every 0.5 seconds). According to an embodiment, the location measurement module 180 may be implemented to include both the GNSS module and the NLP module.

Each of the first and second external electronic devices 102 and 104 may be a device of the same or a different type from the electronic device 101. According to an embodiment, the server 106 may include a group of one or more servers. According to various embodiments, all or some of the operations performed by the electronic device 101 may be performed by another electronic device or a plurality of electronic devices (for example, the electronic device 102 or 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result of the execution to the electronic device 101. The electronic device 101 may provide the received result as it is or additionally process the received result and provide the requested functions or services. To achieve this, for example, cloud computing, distributed computing, or client-server computing technology may be used.

Figure 2:
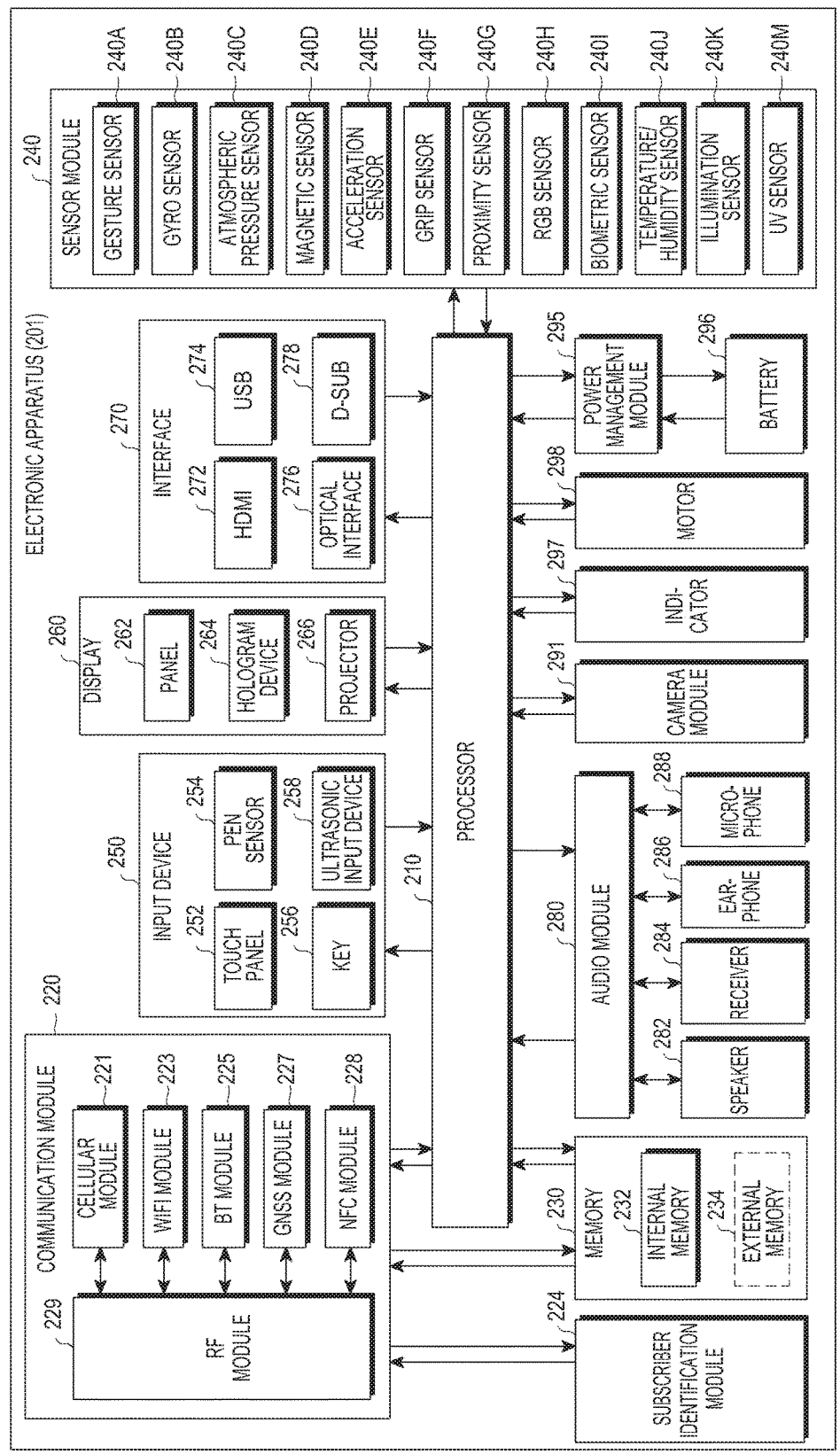
FIG. 2 is a block diagram illustrating an electronic device according to an embodiment of the present disclosure.

FIG. 2 is a block diagram illustrating an electronic device according to an embodiment of the present disclosure.

Referring to FIG. 1, an electronic device 201 may include, for example, the whole or part of the electronic device 101 illustrated in FIG. 1. The electronic device 201 may include at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware or software elements connected to the processor 210 by running, for example, an OS or an application program, and may perform processing of and arithmetic operations on various data. The processor 210 may be implemented by, for example, a system on chip (SoC). According to an embodiment, the processor 210 may further include a graphics processing unit (GPU) and/or an image signal processor (ISP). The processor 210 may include at least some (for example, a cellular module 221) of the elements illustrated in FIG. 2. The processor 210 may load, into a volatile memory, instructions or data received from at least one (for example, a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (for example, a GPS module, a Glonass module, a Beidou module, or a Galileo module), an NFC module 228, and a radio frequency (RF) module 229. According to an embodiment, the location GNSS module 227 may generate and transfer GPS information indicating a location (for example, a GPS coordinate) of the electronic device 201 (for example, the electronic device 101) to the corresponding application 147 according to a request of the application 147 every predefined time (for example, every 0.5 seconds).

According to an embodiment, the communication module 220 may further include the NLP module (not shown). The NLP module may generate NLP information indicating the location of the electronic device 201 (for example, the electronic device 101) on the network. The NLP module may generate and transfer NLP information indicating a location of the electronic device 101 (for example, cell information and Wi-Fi information) to the corresponding application 147 according to a request of the application 147 every predefined time (for example, every 0.5 seconds).

The cellular module 221 may provide a voice call, an image call, a text message service, or an Internet service through, for example, a communication network. According to an embodiment, the cellular module 221 may identify and authenticate the electronic device 201 within a communication network using a SIM 224 (for example, the SIM card).

According to an embodiment, the cellular module 221 may perform at least some of the functions, which can be provided by the AP 210. According to an embodiment, the cellular module 221 may include a CP.

Each of the Wi-Fi module 223, the BT module 225, the GNSS module 227, and the NFC module 228 may include, for example, a processor for processing data transmitted and received through the corresponding module. According to some embodiments, at least some (two or more) of the cellular module 221, the Wi-Fi module 223, the BT module 225, the GNSS module 227, and the NFC module 228 may be included in one integrated chip (IC) or IC package.

The radio frequency (RF) module 229 may transmit/receive, for example, a communication signal (for example, an RF signal). The RF module 229 may include, for example, a transceiver, a power amplifier module (PAM), a frequency filter, a low noise amplifier (LNA), and an antenna. According to another embodiment, at least one of the cellular module 221, the Wi-Fi module 223, the BT module 225, the GPS module 227, and the NFC module 228 may transmit/receive an RF signal through a separate RF module.

The SIM 224 may include, for example, a card including a subscriber identity module and/or an embedded SIM, and may contain unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include at least one of a volatile memory (for example, a dynamic random access memory (DRAM), a static RAM (SRAM), a synchronous dynamic RAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard disk drive, a solid state drive (SSD), and the like).

The external memory 234 may further include a flash drive, for example, a compact flash (CF), a secure digital (SD), a micro SD (Micro-SD), a mini SD (Mini-SD), an extreme digital (xD), a memory stick, and the like. The external memory 234 may be functionally and/or physically connected to the electronic apparatus 201 through various interfaces.

The sensor module 240 may measure a physical quantity or detect an operation state of the electronic device 201 (for example, the electronic device 101), and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, and an ultrasonic input unit 258. The touch panel 252 may use at least one of, for example, a capacitive type, a resistive type, an infrared type, and an ultrasonic type. In addition, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, a microphone 288) and identify data corresponding to the detected ultrasonic waves.

The display 260 (for example, the display 160) may include a panel 262, a hologram device 264, or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram device 264 may show a three dimensional (3D) image in the air by using an interference of light. The projector 266 may display an image by projecting light onto a screen. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, an HDMI 272, a USB 274, an optical interface 276, and a d-subminiature (D-sub) 278. The interface 270 may be included in, for example, the communication interface 170 illustrated in FIG. 1. Additionally or alternatively, the interface 270 may include, for example, a mobile high-definition link (MHL) interface, a SD card/multi-media card (MMC) interface, or an Infrared Data Association (IrDA) standard interface.

The audio module 280 may bi-directionally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288, and the like.

The camera module 291 is a device which may photograph a still image and a dynamic image. According to an embodiment, the camera module 291 may include one or more image sensors (for example, a front sensor or a back sensor), a lens, an ISP or a flash (for example, LED or xenon lamp).

The power management module 295 may manage, for example, power of the electronic device 201 (for example, the electronic device 101). According to an embodiment, the power management module 295 may include a power management integrated circuit (PMIC), a charger integrated circuit (IC), or a battery or fuel gauge. The PMIC may have a wired and/or wireless charging scheme. Examples of the wireless charging method may include, for example, a magnetic resonance method, a magnetic induction method, an electromagnetic method, and the like. Additional circuits (e.g., a coil loop, a resonance circuit, a rectifier, and the like) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state, for example, a booting state, a message state, a charging state, and the like of the electronic device 201 or a part (for example, the processor 210) of the electronic device 201. The motor 298 may convert an electrical signal into mechanical vibration, and may generate vibration, a haptic effect, and the like. Although not illustrated, the electronic device 201 may include a processing unit (for example, a GPU) for supporting a mobile TV. The processing unit for supporting mobile TV may, for example, process media data according to a certain standard, such as digital multimedia broadcasting (DMB), digital video broadcasting (DVB), or mediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
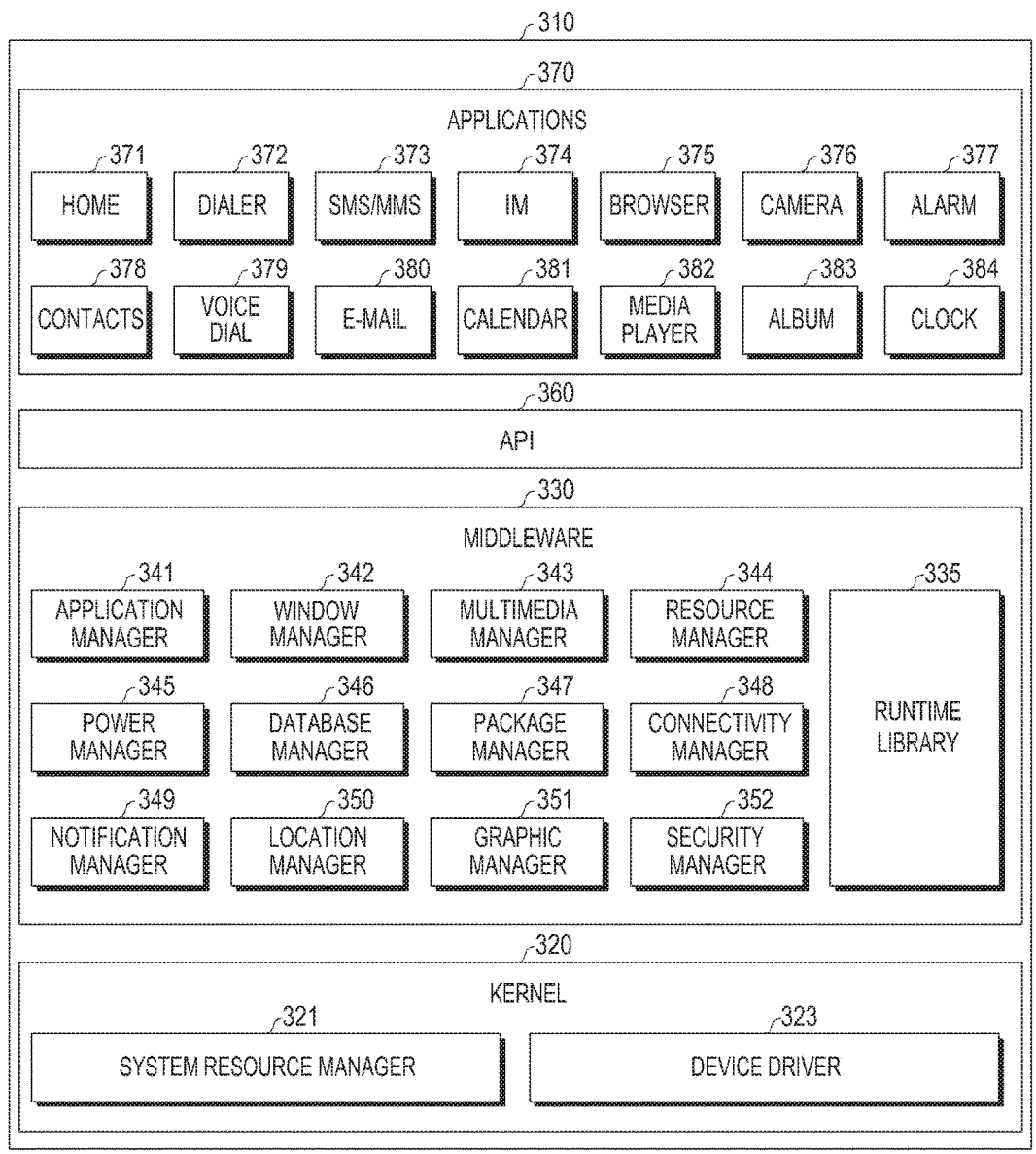
FIG. 3 is a block diagram illustrating a program module according to an embodiment of the present disclosure.

FIG. 3 is a block diagram illustrating a program module according to an embodiment of the present disclosure.

Referring to FIG. 3, according to an embodiment, a program module 310 (for example, the program 140) may include an OS for controlling resources related to the electronic device (for example, the electronic device 101) and/or various applications (for example, the application programs 147) executed in the OS. The OS may be, for example, Android, iOS, Windows, Symbian, Tizen, Bada, and the like.

The program module 310 may include a kernel 320, middleware 330, an API 360, and/or applications 370. At least some of the program module 310 may be preloaded on the electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may perform the control, allocation, retrieval, and the like, of system resources. According to an embodiment, the system resource manager 321 may include a process manager, a memory manager, or a file system manager. The device driver 323 may include, for example, a display driver, a camera driver, a BT driver, a shared memory driver, a USB driver, a keypad driver, a Wi-Fi driver, an audio driver, or an inter-process communication (IPC) driver.

For example, the system resource manager 321 may control allocation, withdrawal, and reallocation of system resources to the applications by controlling transmission of service data (for example, GPS information or NLP information) to the applications. According to an embodiment, the processor 120 may control, allocate, or withdraw the system resources allocated to each application by controlling the system resource manager 321.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, and the like.

The application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources, such as a source code, a memory, a storage space, and the like of at least one of the applications 370.

The power manager 345 may operate together with a basic input/output system (BIOS) to manage a battery or power, and may provide power information required for the operation of the electronic device. The database manager 346 may generate, search for, and/or change a database to be used by at least one of the applications 370. The package manager 347 may manage an installation or an update of an application distributed in a form of a package file.

The connectivity manager 348 may manage a wireless connection, such as, for example, Wi-Fi or BT. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect to be provided to a user and a user interface relating to the graphic effect. The security manager 352 may provide various security functions required for system security, user authentication, and the like. According to an embodiment, when the electronic device (for example, the electronic device 101) has a telephone call function, the middleware 330 may further include a telephony manager for managing a voice call function or a video call function of the electronic device.

The middleware 330 may include a middleware module that forms a combination of various functions of the above-described elements. The middleware 330 may provide modules specialized according to types of OS s in order to provide differentiated functions. In addition, the middleware 330 may dynamically remove the elements of the related art, or add new elements.

The API 360 (for example, the API 145), which is a set of API programming functions, may be provided in a different configuration for each OS. For example, in the case of Android or iOS, one API set may be provided for each platform. In the case of Tizen, two or more API sets may be provided for each platform.

The applications 370 (for example, the application programs 147) may include, for example, one or more applications which can provide functions, such as home 371, dialer 372, SMS/MMS 373, instant message (IM) 374, browser 375, camera 376, alarm 377, contacts 378, voice dial 379, email 380, calendar 381, media player 382, album 383, clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Further, the notification relay application may receive notification information from, for example, an external electronic device and provide the received notification information to a user.

The device management application may manage (for example, install, delete, or update), for example, at least one function of an external electronic device (for example, the electronic device 102 or 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment, the applications 370 may include an application (for example, a health care application of a mobile medical device, and the like) designated according to an attribute of the external electronic device (for example, the electronic device 102 or 104). According to an embodiment, the applications 370 may include an application received from the external electronic device (for example, the server 106, or the electronic device 102 or 104). According to an embodiment, the applications 370 may include a preloaded application or a third party application that can be downloaded from a server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" used in an embodiment of the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4:
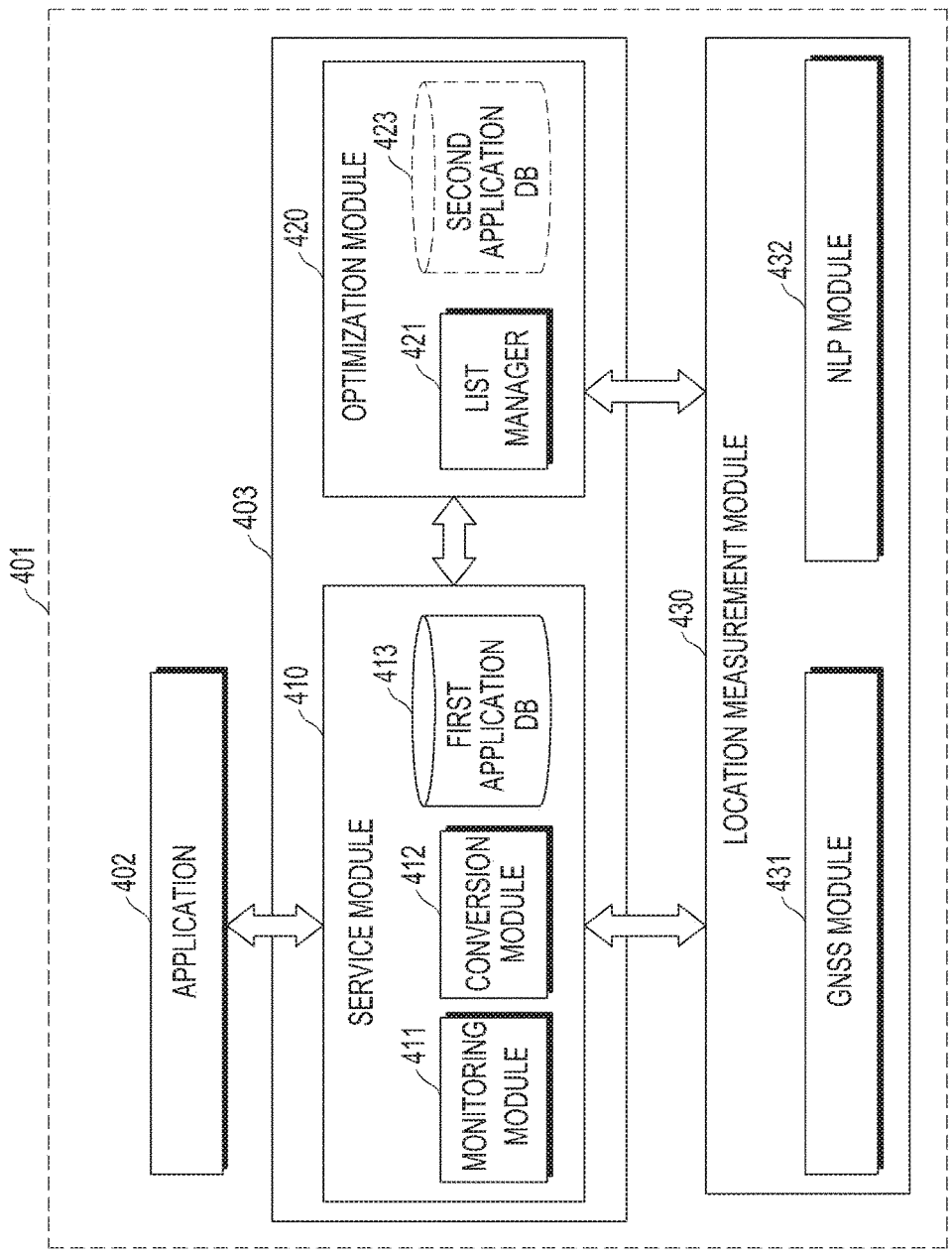
FIG. 4 is a block diagram illustrating an electronic device for managing an application according to an embodiment of the present disclosure.

FIG. 4 is a block diagram illustrating an electronic device for managing an application according to an embodiment of the present disclosure.

Referring to FIG. 4, an electronic device 401 (for example, the electronic device) may include a framework 403 (or middleware (for example, the middleware 330)) and/or a location measurement module 430. The framework 403 may execute at least one application program 402 and may include at least one of a service module 410 and an optimization module 420.

The service module 410 may include at least one of a monitoring module 411, a conversion module 412, and a first application DB 413. The optimization module 420 may include at least one of a list manager 421 and a second application DB 423. The location measurement module 430 may include a GNSS module 431 and/or an NLP module 432.

The application 402 may be at least one application that makes a request for location information to the location measurement module 430 through the service module 410. The location requested by the application 402 may be a current location of the electronic device 401.

According to an embodiment, the service module 410 may provide the location information in response to the request for the location information from the application 402. The monitoring module 411 may monitor at least one application 402 executed in the electronic device 401 in real time. The monitoring module 411 may determine whether each of the applications abnormally operates by monitoring the applications executed in the electronic device 401 in real time. When the application that abnormally operates is found, the monitoring module 411 may determine validity of the corresponding application 402. For example, when the application 402 is executed in the background or when the display 160 of the electronic device 101 is turned off, the monitoring module 411 may determine that the corresponding application 402 is not valid.

According to an embodiment, the service module 410 may determine whether at least one application corresponds to an application that abnormally operates according to attributes of the application. For example, the service module 410 may recognize that a navigation-related application corresponds to an application, which does not abnormally operate, among the applications periodically requesting location information. Accordingly, even though the display 160 is turned off or the navigation-related application is executed in the background, the service module 410 may periodically transfer the location information to the navigation-related application.

For example, the service module 410 may recognize that applications except for the navigation-related application correspond to applications, which may abnormally operate, among the applications periodically requesting location information. Accordingly, even though the display 160 is turned off or the application other than the navigation-related application is executed in the background, the optimization module 420 may not transfer the location information to the application other than the navigation-related application.

When the application 402 is executed and the application 402 makes a request for location information, the service module 410 may determine whether the corresponding application 402 is included in a first application list (for example, a blacklist) stored in the first application DB 413. When the application is included in the first application list, the conversion module 412 may make a request for location information, which will be transferred to the application 402, to the optimization module 420. For example, when the application included in the first application list makes a request for GPS information, the conversion module 412 may convert the request into a format (for example, a fused location provider (FLP)) supported by the optimization module 420 and transfer the request to the optimization module 420, so that the request for the GPS information of the application can be transferred to the optimization module 420.

According to an embodiment, the conversion module 412 may make a request for service data (for example, GPS information and NLP information) requested by the application 402 included in the first application list to the optimization module 420 and receive (or acquire) the service data from the optimization module 420. The conversion module 412 may convert the service data requested by the application 402 into the format supported by the application 402 and transfer the service data to the application 402.

For example, the conversion module 412 may make a request for GPS information outputted from the GNSS module 431 or NLP information (for example, cell information or Wi-Fi information) outputted from the NLP module 432 to the optimization module 420. The optimization module 420 may make a request for location information (for example, GPS information or NLP information) to the GNSS module 431 or the NLP module 432, acquire (or receive) the location information, and transfer the acquired location information to the conversion module 412. The conversion module 412 may convert the location information into the format requested by the application 402 and transfer the converted location information.

The first application list may be stored in the first application DB 413. According to an embodiment, the first application list, which is transferred from the second application DB 423 of the optimization module 420, may be at least a part of the second application list stored in the second application DB 423.

The monitoring module 411 of the service module 410 may determine whether the application 402 is registered in the application list based on the application list stored in the first application DB 413.

The optimization module 420 may be electrically connected to the service module 430 to acquire (or receive) location information (for example, GPS information or NLP information) from the location measurement module 430 and transfer the acquired location information to the service module 410. According to an embodiment, the optimization module 420 may determine whether to respond to the request for the location information from the application 402 based on at least one of a state of the display 160 and attributes of the application 402 having requested the location information. For example, when the application 402 is registered in the second application list and the display 160 is turned off, the optimization module 420 may not respond to the request for the location information. For example, when the application 402 is registered in the second application list and an execution screen provided by the application 402 is executed in the background, the optimization module 420 may not respond to the request for the location information. For example, when the application 402 is not registered in the second application list, the optimization module 420 may transfer the location information to the service module 410 in response to the request for the location information.

As described above, when the optimization module 420 does not transfer the location information to the conversion module 412, the application 402, which operates based on the location information acquired from the conversion module 412, cannot activate a session using the location information. Further, since the session cannot be activated, resources required for the operation of the application 402 are not used, and thus the resources can be saved.

According to an embodiment, the optimization module 420 may determine whether a second event is generated in the electronic device 401 according to a detection value of the sensor module 240 (for example, the gyro sensor 240B or the acceleration sensor 240E) included in the electronic device 101. The second event may be an event by which the electronic device 101 escapes from the sleep mode or an event by which the application registered in the application list is executed in the foreground. When the second event is generated, the optimization module 420 may grasp context of the electronic device 401 and, when the context is not changed from previous request context, transfer the service data before the second event is generated to the conversion module 412. As described above, by transferring the service data before the second event is generated to the conversion module 412, an unnecessary operation of the location measurement module 430 can be limited.

According to an embodiment, the electronic device 401 may further include the sensor module 240 (for example, the gesture sensor 240A, the gyro sensor 240B, the acceleration sensor 240E, the grip sensor 240F, the proximity sensor 240G, and the biometric sensor 240I) that detects a user's motion. When a user's motion (for example, stationary, walking, running, or getting in a car) is generated based on a result of the measurement through the sensor module 240, the optimization module 420 may determine a current state of the electronic device 401 and determine whether to transfer location information to one or more applications according to the current state. When the corresponding application is registered in the application list, the optimization module 420 may transfer location information before the motion is generated to the application. When the corresponding application is not registered in the application list, the optimization module 420 may transfer the location information measured by measurement module 430 to the application.

The list manager 421 may manage the second application list. According to an embodiment, the list manager 421 may create, delete, or update the second application list. The list manager 421 may store the second application list in the second application DB 423.

The second application list may be stored in the second application DB 423. According to an embodiment, the second application DB 423 may store information on each of the applications stored in the electronic device 101.

According to an embodiment, the GNSS module 431 of the location measurement module 430 may output GPS information of the electronic device 101 (for example, the GPS coordinate) as service data. The NLP module 432 may output NLP information of the electronic device 101 (for example, network-related information or an IP address) as service data.

Figure 5:
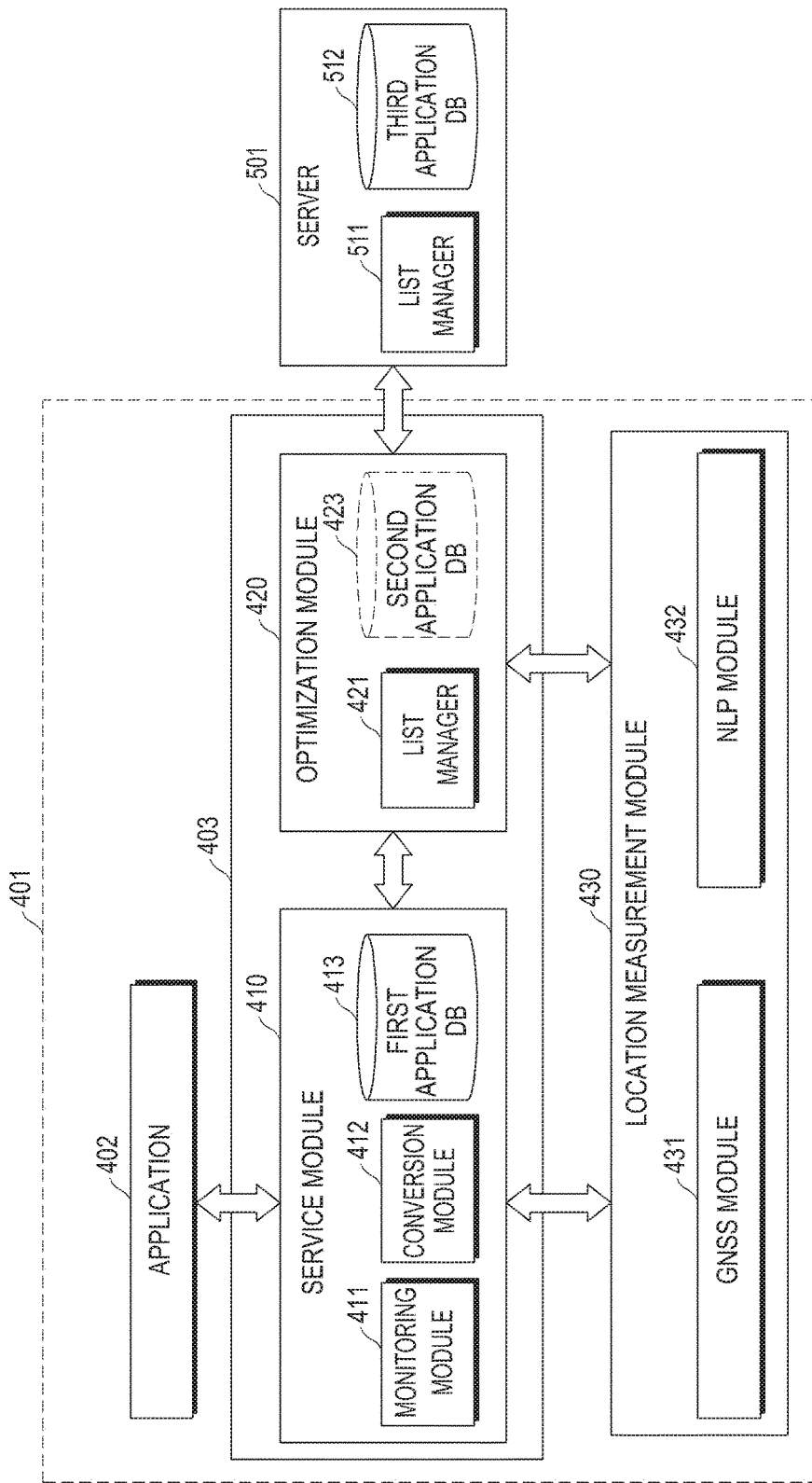
FIG. 5 is a block diagram illustrating an electronic device and a server that manage applications according to an embodiment of the present disclosure.

FIG. 5 is a block diagram illustrating an electronic device and a server that manage applications according to an embodiment of the present disclosure.

Referring to FIG. 5, the electronic device 401 may include the framework 403 (or middleware (for example, the middleware 330)) and/or the location measurement module 430. The framework 403 may execute at least one application program 402 and may include at least one of the service module 410 and the optimization module 420.

The service module 410 may include at least one of the monitoring module 411, the conversion module 412, and the first application DB 413. The optimization module 420 may include at least one of the list manager 421 and/or the second application DB 423. The location measurement module 430 may include the GNSS module 431 and/or the NLP module 432.

The application 402 may be at least one application that makes a request for location information to the location measurement module 430 through the service module 410. The location requested by the application 402 may be a current location of the electronic device 401.

According to an embodiment, the service module 410 may provide the location information in response to the request for the location information from the application 402. The monitoring module 411 may monitor at least one application 402 executed in the electronic device 401 in real time. The monitoring module 411 may determine whether each of the applications abnormally operates by monitoring the applications executed in the electronic device 401 in real time. When the application that abnormally operates is found, the monitoring module 411 may determine validity of the corresponding application 402. When the application 402 is executed in the background or when the display 160 of the electronic device 101 is turned off, the monitoring module 411 may determine that the corresponding application 402 is not valid.

According to an embodiment, the service module 410 may determine whether at least one application corresponds to an application that abnormally operates according to attributes of the application. For example, the service module 410 may recognize that a navigation-related application corresponds to an application, which does not abnormally operate, among the applications periodically requesting location information. Accordingly, even though the display 160 is turned off or the navigation-related application is executed in the background, the service module 410 may periodically transfer the location information to the navigation-related application.

For example, the service module 410 may recognize that applications except for the navigation-related application correspond to applications, which may abnormally operate, among the applications periodically requesting location information. Accordingly, even though the display 160 is turned off or the application other than the navigation-related application is executed in the background, the optimization module 420 may not transfer the location information to the application other than the navigation-related application.

When the application 402 is executed and the application 402 makes a request for location information, the service module 410 may determine whether the corresponding application 402 is included in a first application list (for example, a blacklist). When the application is included in the first application list, the conversion module 412 may make a request for location information, which will be transferred to the application 402, to the optimization module 420. For example, when the application 402 included in the first application list makes a request for GPS information, the conversion module 412 may convert the request into a format (for example, an FLP) supported by the optimization module 420 and transfer the request to the optimization module 420, so that the request for the GPS information of the application can be transferred to the optimization module 420.

According to an embodiment, as described above, the conversion module 412 may make a request for service data (for example, GPS information and NLP information) requested by the application 402 included in the first application list to the optimization module 420 and receive the service data from the optimization module 420. The conversion module 412 may convert the service data into the format requested (or supported) by the application 402 and transfer the service data to the application 402.

The first application list may be stored in the first application DB 413. According to an embodiment, the first application list may be transferred from the second application DB 423 of the optimization module 420 or a third application DB 512 of a server 501. The first application list may be at least a part of the second application list stored in the second application DB 423 or the third application list stored in the third application DB 512.

The monitoring module 411 of the service module 410 may determine whether the application 402 is registered in the application list based on the application list stored in the first application DB 413.

The optimization module 420 may be electrically connected to the location measurement module 430 to receive location information (for example, GPS information or NLP information) from the location measurement module 430 and transfer the location information to the service module 410. According to an embodiment, the optimization module 420 may determine whether to respond to the request for the location information from the application 402 based on at least one of a state of the display 160 and attributes of the application 402 having requested the location information. For example, when the application 402 is registered in the second application list and the display 160 is turned off, the optimization module 420 may not respond to the request for the location information. For example, when the application 402 is registered in the second application list and an execution screen provided by the application 402 is executed in the background, the optimization module 420 may not respond to the request for the location information. For example, when the application 402 is not registered in the second application list, the optimization module 420 may transfer the location information to the service module 410 in response to the request for the location information.

As described above, when the optimization module 420 does not transfer the location information to the conversion module 412, the application 402, which operates based on the location information received from the conversion module 412, cannot activate a session using the location information. Further, since the session cannot be activated, resources required for the operation of the application 402 are not used, and thus the resources can be saved.

According to an embodiment, the optimization module 420 may determine whether a second event is generated in the electronic device 401 according to a detection value of the sensor module 240 (for example, the gyro sensor 240B or the acceleration sensor 240E) included in the electronic device 101. The second event may be one of an event by which the electronic device 101 escapes from the sleep mode and an event by which the application registered in the application list is executed in the foreground. When the second event is generated, the optimization module 420 may grasp context of the electronic device 401 and, when the context is not changed from previous request context, transfer the location information before the first event is generated to the conversion module 412. As described above, by transferring the location information before the first event is generated to the conversion module 412, an unnecessary operation of the location measurement module 430 can be limited.

The list manager 421 may manage the second application list. According to an embodiment, the list manager 421 may create, delete, or update the second application list. The list manager 421 may store the second application list in the second application DB 423.

The second application list may be stored in the second application DB 423. According to an embodiment, the second application DB 423 may store information on each of the applications stored in the electronic device 101.

According to an embodiment, the GNSS module 431 of the location measurement module 430 may output GPS information of the electronic device 401 (for example, the GPS coordinate) as service data. The NLP module 432 may output NLP information of the electronic device 401 (for example, network-related information or an IP address) as service data.

According to an embodiment, at least one electronic device (for example, the electronic device 401) may transmit/receive the application list to/from a server 501 through a communication interface (for example, the communication interface 170) included in at least one electronic device.

According to an embodiment, the server 501 (for example, the server 106) may transmit (or broadcast) the application list to at least one electronic device (for example, the electronic device 101, 102, or 104). The server 501 may include a list manager 511 and/or the third application DB 512.

According to an embodiment, the list manager 511 may create, delete, or update a common application list, for example, a third application list transmitted (broadcasted) to at least one electronic device. The server 501 may receive an application list (for example, the first application list or the second application list) from at least one electronic device or receive information on an application which should be registered in the common application list. The list manager 511 may create or update the common application list based on the application list (for example, the first application list or the second application list) received from at least one electronic device or information on the application which should be registered in the common application list.

For example, it is assumed that the server 501 receives a fourth application list, in which application #1, application #2, application #3, and application #4 are registered, from a first electronic device and receives a fifth application list, in which application #1, application #2, application #3, application #4, and application #5 are registered, from a second electronic device. The list manager 511 may additionally register application #1, application #2, and application #4, which are registered in the fourth application list and the fifth application list in common, in the common application list or create a common application list based on information on application #1, application #2, and application #4. As described above, the list manager 511 may add the applications which are included, in common, in the application lists (for example, the first application list and the second application list) received from one or more electronic devices to the common application list (for example, the third application list).

For example, it is assumed that the server 501 receives a sixth application list, in which application #1, application #2, application #3, and application #4 are registered, from the first electronic device, receives a seventh application list, in which application #1, application #5, application #6, and application #7 are registered, and then receives an eighth application list in which application #1, application #8, and application #9 are registered. The list manager 511 may add application #1, which is registered in the sixth to eighth application lists in common, to the common application list. As described above, the list manager 511 may add applications, which are included in the application lists in common, received from one or more electronic devices at different time points to the common application list.

According to an embodiment, the third application DB 512 may store the common application list (for example, the third application list) managed by the list manager 511 of the server 501.

According to an embodiment, the list manager 511 may insert, into the common application list (for example, the third application list), an application which is included in a preset number or more of application lists in common among the applications included in the application lists received from one or more electronic devices (for example, the electronic devices 101, 102, and 104). For example, it is assumed that application lists are received from the first electronic device 10 times. The list manager 511 may register, in the common application list, an application which is included in eight application lists in common among the ten application lists received 10 times.

An electronic device for managing one or more applications according to an embodiment of the present disclosure may include a display, a location measurement module, a communication interface, a memory configured to store a first application program and a second application program, and a processor, electrically connected to the display, the location measurement module, the communication interface, and the memory, configured to execute the first application program, acquire a location information request from the first application program, and determine whether to respond to the location information request at least partially based on a state of the display or information related to the first application program when the instructions are executed.

According to an embodiment, in the electronic device, if the display is turned off, the processor is further configured to ignore the location information request.

According to an embodiment, in the electronic device, if the display is turned off, the processor is further configured to provide to the first application program, location information previously measured by the location measurement module in response to the location information request.

According to an embodiment, in the electronic device, the processor is further configured to not turn on the location measurement module in response to the location information request.

According to an embodiment, in the electronic device, the memory further may store an application list for at least one application program, and the processor is further configured to determine whether to respond to the location information request at least partially based on whether the first application program is included in the application list.

According to an embodiment, in the electronic device, if the display is turned on, the processor is further configured to provide, to the first application program, location information currently measured by the location measurement module in response to the location information request.

According to an embodiment, in the electronic device, when if display is turned on and a user interface of the first application program is not displayed through the display, the processor is further configured to ignore the location information request.

According to an embodiment, in the electronic device, if the display is turned on and a user interface of the first application program is not displayed through the display, the processor is further configured to provide, to the first application program, data previously measured by the location measurement module.

According to an embodiment, in the electronic device, the processor is further configured to execute the second application program, acquire a location information request from the second application program, and respond to the location information request based on information related to the second application program.

Figure 6:
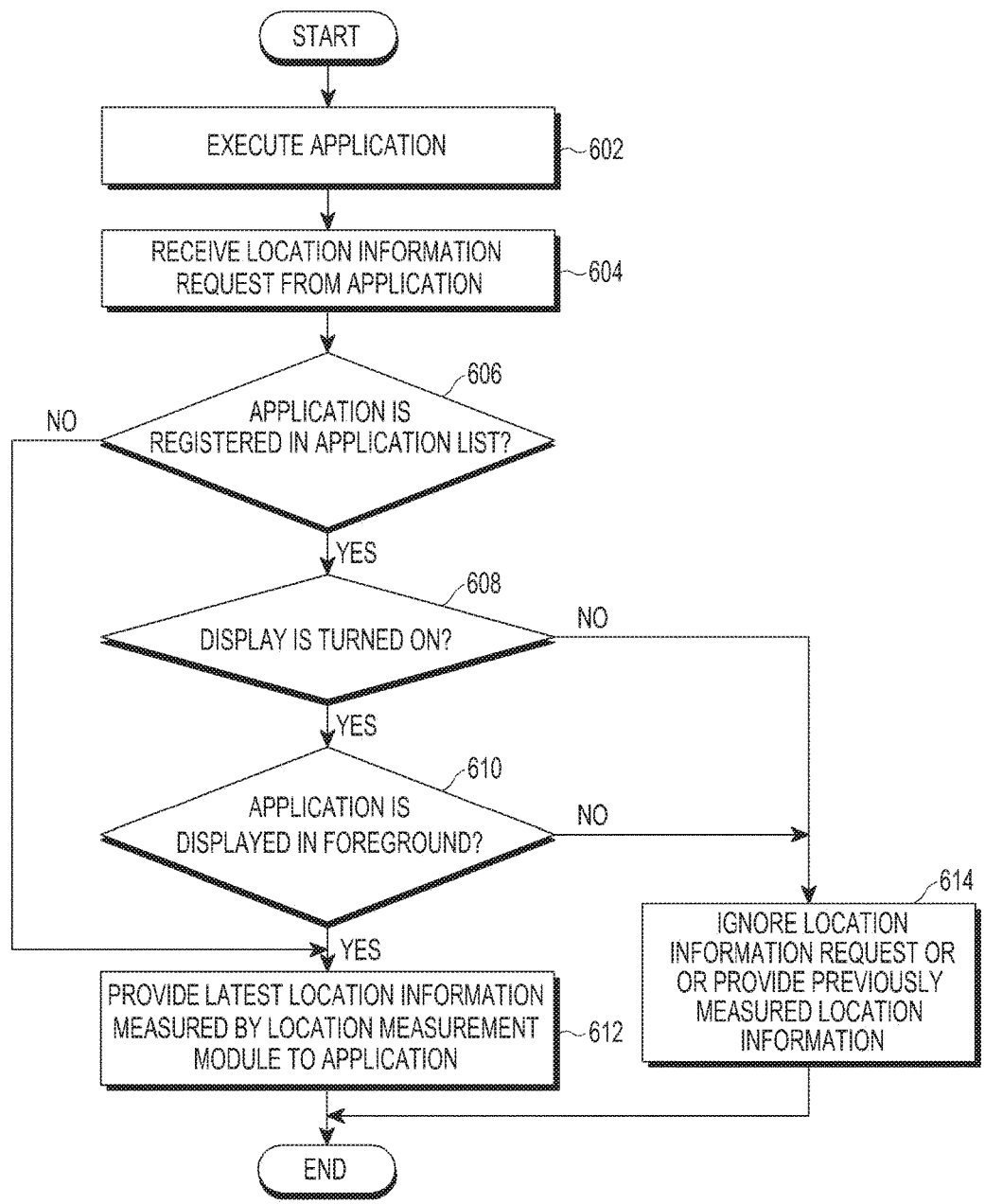
FIG. 6 is a flowchart illustrating a method of managing an application by an electronic device according to an embodiment of the present disclosure.

FIG. 6 is a flowchart illustrating a method of managing an application by an electronic device according to an embodiment of the present disclosure.

Referring to FIG. 6, an application (for example, the application 402) is executed by the electronic device (for example, the processor 120) in operation 602, and the service module 410 of the processor 120 may receive (or acquire) a location information request from the application in operation 604. The processor 120 may determine whether the application corresponds to the application included in the application list in operation 606.

When the application does not correspond to the application included in the application list based on a result of the determination of operation 606 (606: No), the processor 120 may provide location information currently measured by the location measurement module to the application in operation 612.

When the application corresponds to the application included in the application list based on a result of the determination of operation 606 (606: Yes), the processor 120 may determine whether the display 160 is turned on by identifying a state of the display 160 in operation 608.

When the display 160 is not turned on, that is, the display 160 is turned off based on a result of the determination of operation 608 (608: No), the processor 120 may ignore the location information request of the application or provide previously measured location information to the application in operation 614.

When the display 160 is turned on based on a result of the determination of operation 608 (608: Yes), the processor 120 may determine whether the application is executed in the foreground by identifying a state of the application in operation 610. When the application is not executed in the foreground, that is, the application is executed in the background based on a result of the determination of operation 610 (610: No), the processor 120 may ignore the location information request of the application or provide previously measured location information to the application in operation 614.

When the application is executed in the foreground based on a result of the determination of operation 610 (610: Yes), the processor 120 may provide latest location information currently measured by the location measurement module 180 to the application in operation 612. According to an embodiment, the processor 120 may transfer location information measured in real time by the location measurement module 180 to the application.

According to an embodiment, the application creates or updates a service to be provided to the user based on the location information. Accordingly, if the location information is not transferred to the application like in operation 614, the service to be provided to the user cannot be created or updated and the session of the application may be deactivated. Therefore, the electronic device 101 can prevent battery consumption and resource waste due to activation of the session of the application related to the service which is not currently provided to the user.

Figure 7:
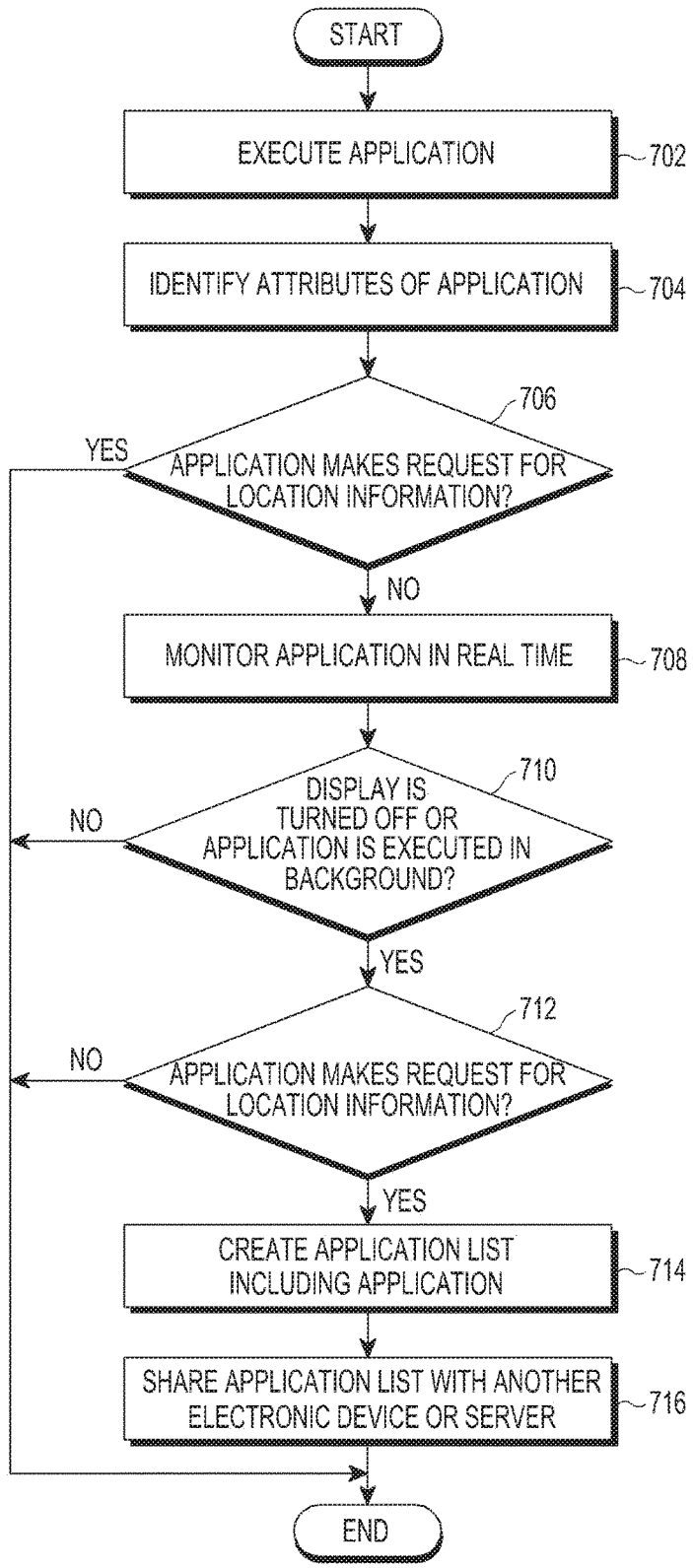
FIG. 7 is a flowchart illustrating a method of managing an application by an electronic device according to an embodiment of the present disclosure.

FIG. 7 is a flowchart illustrating a method of managing an application by an electronic device according to an embodiment of the present disclosure. In FIG. 7, it is assumed that an application list is not pre-stored in the memory 130 of the electronic device 101.

Referring to FIG. 7, the processor 120 included in the electronic device 101 may execute at least one application in operation 702, and the service module 410 included in the processor 120 may identify attributes of at least one application in operation 704. According to an embodiment, the service module 410 may identify whether the application corresponds to an application that makes a request for location information in real time or periodically.

According to another embodiment, the application list may be pre-stored in the memory 130. As described above, when the application is pre-stored in the memory 130, the processor 120 may determine whether the application executed in operation 702 is included in the application list. When the application is included in the application list, the processor 120 may perform at least one of operations 606 to 614 illustrated in FIG. 6.

According to an embodiment, in operation 706, the processor 120 may determine whether the application corresponds to the application that makes the request for location information based on a result of the identification of the attributes of operation 704. When the application corresponds to the application that makes the request for the location information based on a result of the determination of operation 706 (706: Yes), the processor 120 may maintain the current state without any separate operation. According to another embodiment, when the application corresponds to the application that makes the request for the location information based on a result of the determination of operation 706 (706: Yes), the processor 120 may transfer the location information to the application in real time or periodically.

When the application does not correspond to the application that makes the request for the location information based on a result of the determination of operation 706 (706: No), the processor 120 may monitor the application in real time in operation 708. According to an embodiment, the service module 410 may monitor in real time an amount of resources used by the application in operation 708.

According to an embodiment, the processor 120 may determine whether the display 160 of the electronic device 101 is turned off or whether the application is executed in the background in operation 710. When the display is turned on or when the application is executed in the foreground based on a result of the determination of operation 710 (710: No), the processor 120 may maintain the current state without any separate operation. When the display 160 is turned off or when the application is executed in the background based on a result of the determination of operation 710 (710: Yes), the processor 120 may determine whether the application makes the request for the location information in operation 712.

When the application does not make the request for the location information based on a result of the determination of operation 712 (712: No), the processor 120 may maintain the current state without any separate operation. When the application makes the request for the location information based on a result of the determination of operation 712 (712: Yes), the processor 120 may create an application list including the application in operation 714. The application list created in operation 714 may include information on the applications (for example, a name, a module (or engine) related to the application, a description of an abnormal operation of the application, and an amount of resources used by the application).

According to an embodiment, the processor 120 may share the application list with another electronic device (for example, the electronic device 102 or 104, or the server 106) in operation 716. According to an embodiment, the processor 120 may share the application list with the other electronic device or the server 106 by transmitting the application list to the other electronic device or the server 106.

Figure 8A:
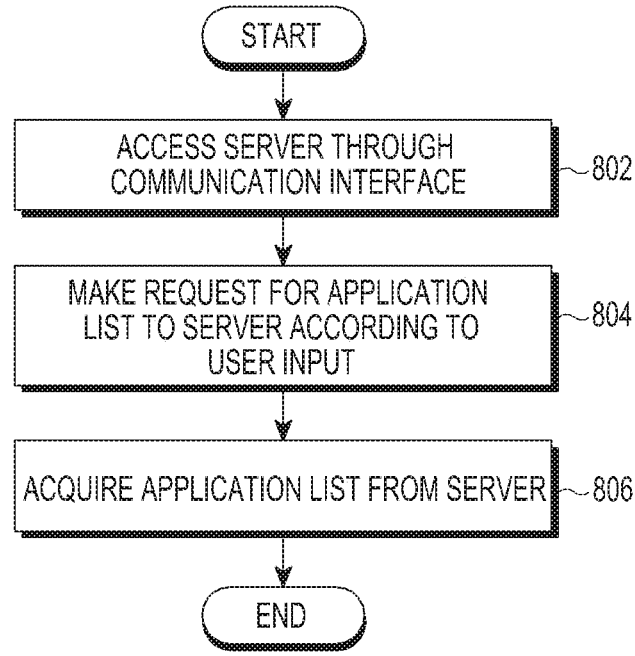
FIGS. 8A to 8C are flowcharts illustrating a method of acquiring an application list by an electronic device according to various embodiments of the present disclosure.
Figure 8B:
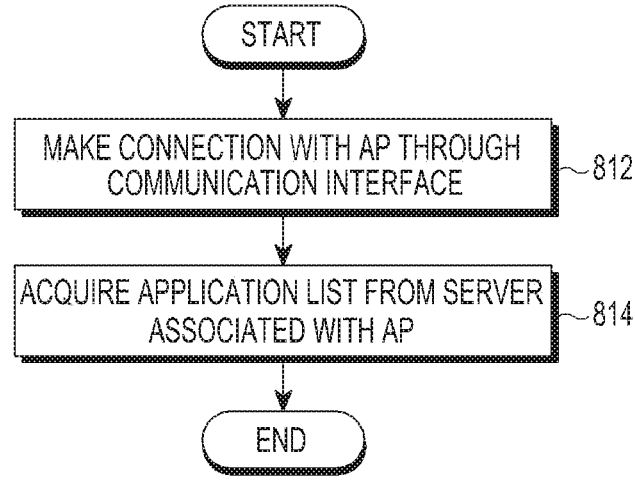
Figure 8C:
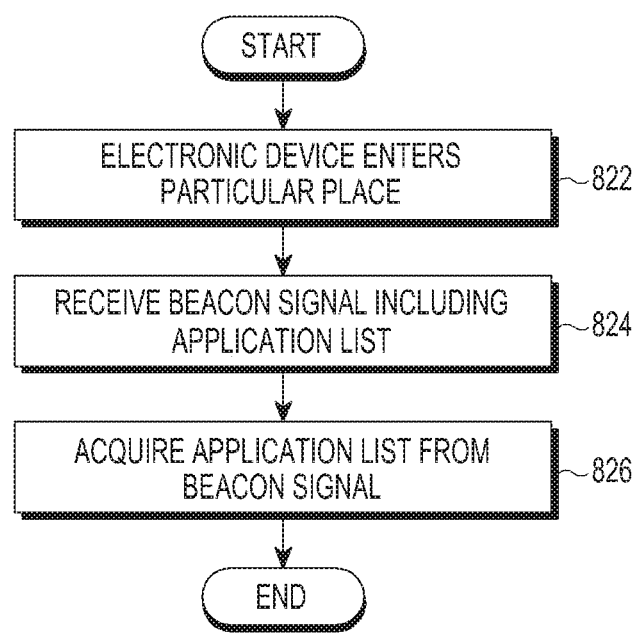

FIGS. 8A to 8C are flowcharts illustrating a method of acquiring an application list by an electronic device according to various embodiments of the present disclosure.

Referring to FIG. 8A, the processor 120 of the electronic device 101 may access a server (for example, the server 106) through the communication interface 170 in operation 802. According to an embodiment, the electronic device 101 may receive, from the user, a user input for receiving the application list from the server. In operation 804, the processor 120 may make a request for the application list to the server through the communication interface 170 according to the user input. In operation 806, the electronic device 101 may acquire the application list from the server through the communication interface 170.

Referring to FIG. 8B, the processor 120 of the electronic device 101 may access an access point (AP) (for example, Wi-Fi) through the communication interface 170 in operation 812. According to an embodiment, the electronic device 101 may acquire the application list from a server (for example, the server 106) associated with the AP through the communication interface 170 in operation 814.

Referring to FIG. 8C, the electronic device 101 may enter a particular place in operation 822. According to an embodiment, the particular place may be a place to which a beacon signal including the application list is broadcasted. The processor 120 may receive the beacon signal including the application list through the communication interface 170 in operation 824. The processor 120 may acquire the application list from the beacon signal in operation 826.

Figure 9:
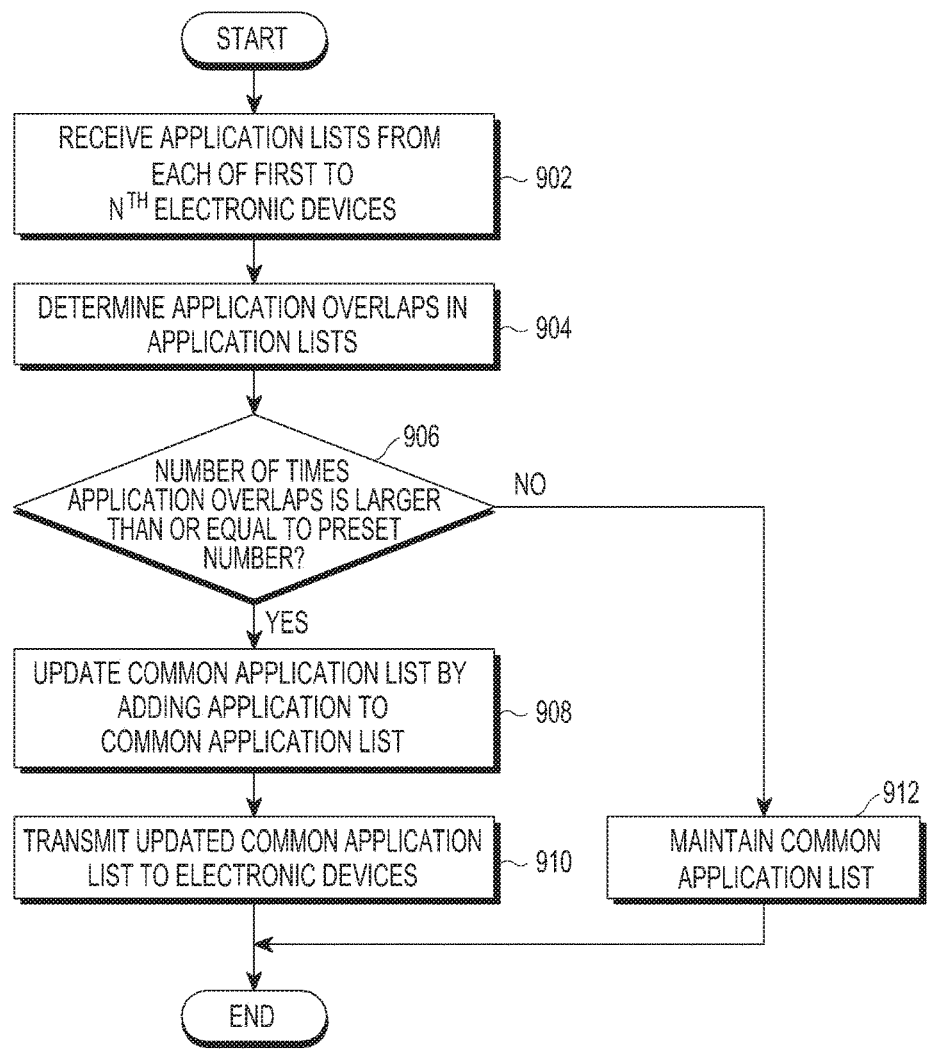
FIG. 9 is a flowchart illustrating a method of managing an application list by a server according to an embodiment of the present disclosure.

FIG. 9 is a flowchart illustrating a method of managing an application list by a server according to an embodiment of the present disclosure.

Referring to FIG. 9, the server 106 may receive application lists from each of first to $N^{th}$ electronic devices in operation 902. In operation 904, the server 106 may determine an application which overlaps in the application lists.

According to an embodiment, the server 106 may determine whether the number of times the application overlaps is larger than or equal to a preset number of times in operation 906. According to an embodiment, the server 106 may determine an application which is included in a preset number of application lists in common among the application lists received from each of the first to $N^{th}$ electronic devices in operation 906.

When the number of times the application overlaps is larger than or equal to the preset number based on a result of the determination of operation 906 (906: Yes), the server 106 may add the application to a common application list managed by the server 106 to update the common application list in operation 908. When the common application list is updated in operation 908, the server 106 may transmit (or broadcast) the updated common application list to the first to $N^{th}$ electronic devices in operation 910.

When the number of times the application overlaps is smaller than the preset number of times based on a result of the determination of operation 906 (906: No), the server 106 may maintain the common application list pre-stored in the server 106 in operation 912. According to an embodiment, the server 106 may transmit (or broadcast) the maintained common application list to the first to $N^{th}$ electronic devices in operation 912.

Figure 10:
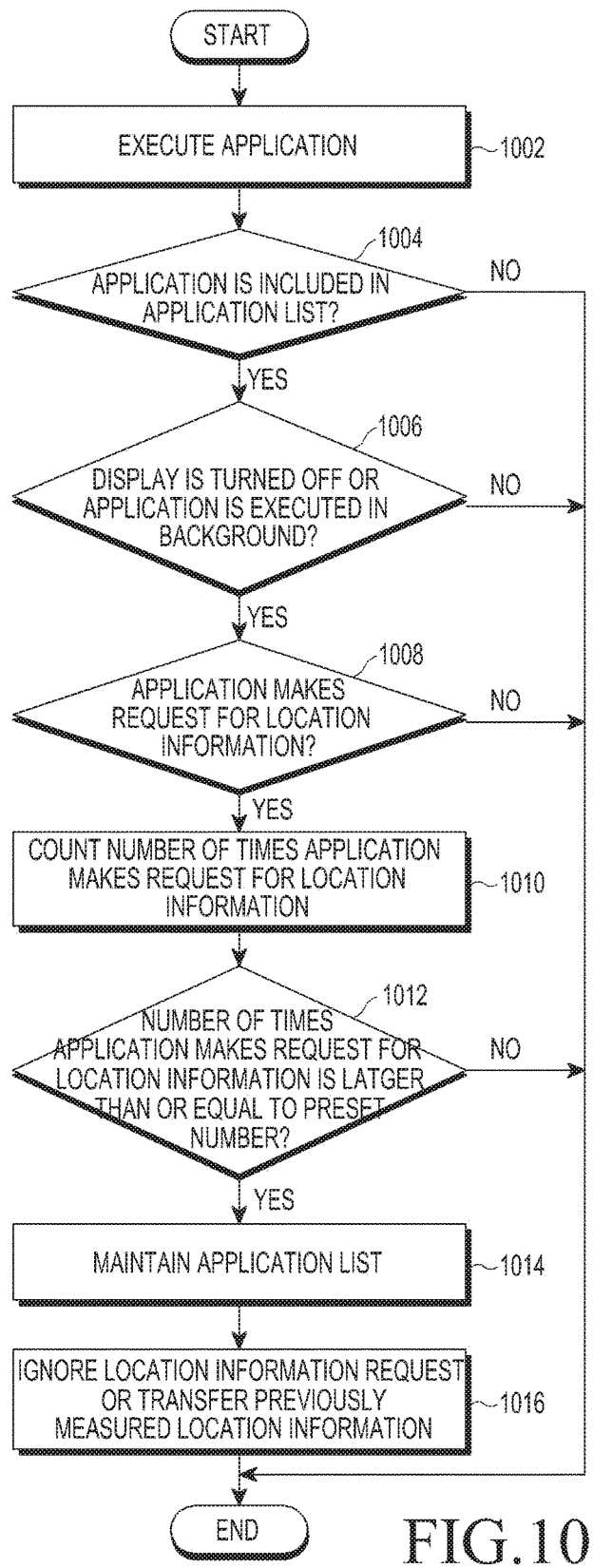
FIG. 10 is a flowchart illustrating a method of managing an application list by an electronic device according to an embodiment of the present disclosure.

FIG. 10 is a flowchart illustrating a method of managing an application list by an electronic device according to an embodiment of the present disclosure.

Referring to FIG. 10, the processor 120 may execute at least one application in operation 1002. The processor 120 may determine whether the application is included in the application list in operation 1004.

When the application is not included in the application list based on a result of the determination of operation 1004 (1004: No), the processor 120 may maintain the current state without any separate operation. According to another embodiment, when the application is not included in the application list, the processor 120 may maintain the application list. When the application is included in the application list based on a result of the determination of operation 1004 (1004: Yes), the processor 120 may determine whether the display 160 is turned off or whether the application is executed in the background in operation 1006.

When the display 160 is turned on and when the application is executed in the foreground based on a result of the determination of operation 1006 (1006: No), the processor 120 may maintain the current state without any separate operation. According to an embodiment, when the display 160 is turned on and the application is executed in the foreground, the processor 120 may maintain the application list. When the display 160 is turned off or when the application is executed in the background based on a result of the determination of operation 1006 (1006: Yes), the processor 120 may determine whether the application makes a request for location information in operation 1008.

When the application does not make the request for the location information based on a result of the determination of operation 1008 (1008: No), the processor 120 may maintain the current state without any separate operation. According to another embodiment, when the application does not make the request for the location information, the processor 120 may maintain the application list. When the application makes the request for the location information based on a result of the determination of operation 1008 (1008: Yes), the processor 120 may count the number of times the application makes the request for the location information in operation 1010.

According to an embodiment, the processor 120 may determine whether the number of times the application makes the request for the location information is larger than or equal to a preset number of times in operation 1012. When the number of times the application makes the request for the location information is smaller than the preset number of times based on a result of the determination of operation 1012 (1012: No), the processor 120 may maintain the current state without any separate operation. According to another embodiment, when the number of times the application makes the request for the location information is smaller than the preset number of times, the processor 120 may delete attribute information of the application (for example, a name of the application, a type of a service module (for example, GNSS module or NLP module) which the application requires, a description of an abnormal operation of the application, and an amount of resources allocated to the application) from the application list. Further, the updated application list as the application is deleted from the application list may be shared with the server 106 or another electronic device 102 or 104 through the communication interface 170 of the electronic device 101.

When the number of times the application makes the request for the location information is larger than or equal the preset number of times based on a result of the determination of operation 1012 (1012: Yes), the processor 120 may maintain the application list in operation 1014. According to an embodiment, the processor 120 may ignore the request for the location information of the application or transfer previously measured location information to the application in operation 1016.

A method for managing one or more applications of an electronic device according to various embodiments of the present disclosure may include executing a first application program, acquiring a location information request from the first application program, determining whether to respond to the location information request at least partially based on a state of the display or information related to the first application program.

According to an embodiment, the method may further include ignoring the location information request if the display is turned off.

According to an embodiment, the method may further include providing, to the first application program, location information previously measured by a location measurement module in response to the location information request, if the display is turned off.

According to an embodiment, in the method, the location measurement module is not turned on in response to the location information request.

According to an embodiment, in the method, determining whether to respond to the location information request at least partially based on the state of the display or the information related to the first application program may include determining whether to respond to the location information request at least partially based on whether the first application program is included in a pre-stored application list.

According to an embodiment, the method may further include providing, to the first application program, location information currently measured by a location measurement module in response to the location information request if the display is turned on.

According to an embodiment, if the display is turned on and a user interface of the first application program is not displayed through the display, the method may further include ignoring the location information request.

According to an embodiment, the method may further include providing, to the first application program, data previously measured by a location measurement module to the first application program if the display is turned on and a user interface of the first application program is not displayed through the display.

According to an embodiment, the method may further include executing the second application program, acquiring a location information request from the second application program, and responding to the location information request based on information related to the second application program.

According to an embodiment, in the method, the location measurement module may include a GNSS module or an NLP module.

Figure 11:
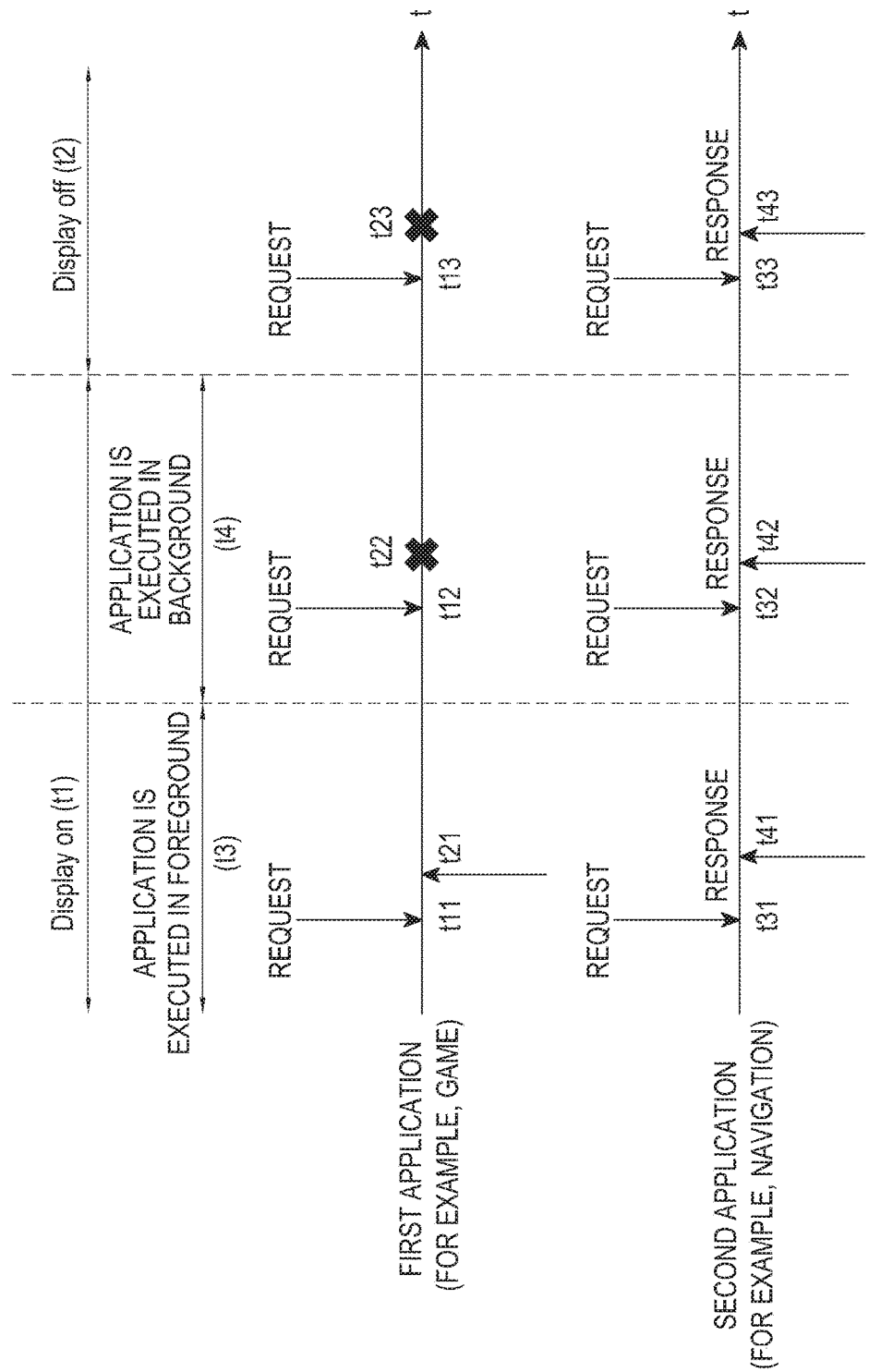
FIG. 11 illustrates an electronic device managing an application according to an embodiment of the present disclosure.

FIG. 11 illustrates an electronic device managing an application according to an embodiment of the present disclosure.

Referring to FIG. 11, it is assumed that a first application and a second application are executed in the electronic device 101, the first application corresponds to an application (for example, a game) registered in and managed by the application list, and the second application corresponds to an application (for example, a navigation application) which is not registered in the application list. Further, it is assumed that a horizontal axis illustrated in FIG. 11 is a time axis (t).

Referring to FIG. 11, the first application may make a request for location information to the service module 410 at time points t11, t12, and t13, and the second application may make a request for location information to the service module 410 at time points t31, t32, and t33. Since the second application is not registered in the application list, a response to the request for the location information, that is, location information measured by the location measurement module 430 may be acquired from the service module 410 of the processor 120 at time points t41, t42, and t43 corresponding to the time points t31, t32, and t33, respectively.

Since the first application is registered in the application list, the optimization module 420 of the processor 120 may determine whether to transfer a response to the request for the location information, that is, location information to the service module 410 according to a current state of the electronic device 101. When the display 160 of the electronic device 101 is turned on (t1) and the first application is executed in the foreground (t3), the optimization module 420 may transfer location information measured by the location measurement module 430 to the service module 410. The service module 410 may transfer the location information to the first application at the time pion t21. When the display 160 of the electronic device 101 is turned on (t1) but the first application is executed in the background (t4), the optimization module 420 may not transfer location information measured by the location measurement module 430 to the service module 410. Accordingly, at the time point t22, the location information may not be transferred to the first application from the service module 410. When the display 160 of the electronic device 101 is turned off (t2), the optimization module 420 may not transfer location information measured by the location measurement module 430 to the service module 410. Accordingly, at the time point t23, the location information may not be transferred to the first application from the service module 410.

As illustrated in FIG. 11, the processor 120 may control an amount of resources to be used by the electronic device 101 by controlling whether to transfer the location information according to the type of application or the current state of the electronic device 101, thereby reducing battery consumption of the electronic device 101.

As described above, various embodiments disclosed in an embodiment of the present disclosure may provide a method and an electronic device for the same which manage an application that makes a request for location information even in a state where the application is executed in the background or a display of the electronic device is turned off.

Figure 12A:
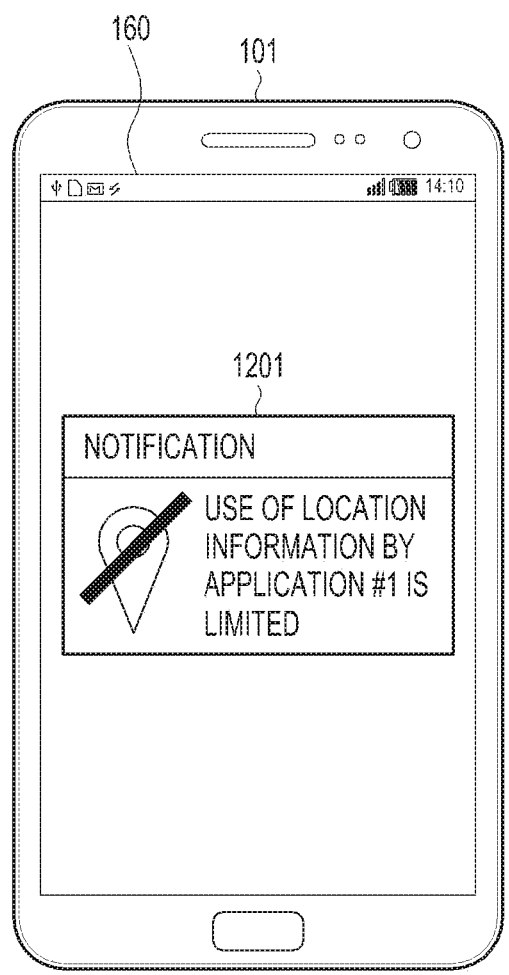
FIGS. 12A and 12B illustrate an electronic device limiting use of location information according to various embodiments of the present disclosure.
Figure 12B:
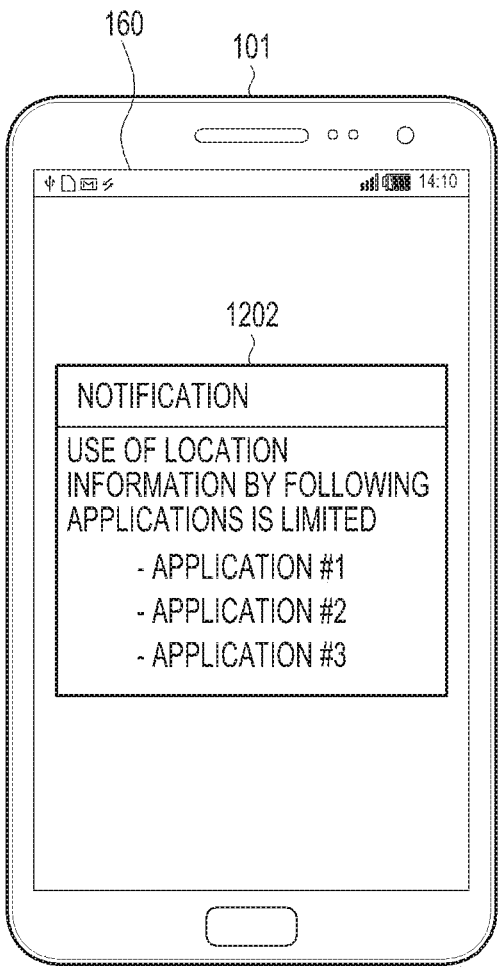

FIGS. 12A and 12B illustrate an electronic device limiting use of location information according to various embodiments of the present disclosure.

Referring to FIGS. 12A and 12B, the display 160 of the electronic device 101 may display a notification window 1201 or 1202 for informing of the limit on the use of the location information by one or more applications. The display 160 displays the limit on the use of the location information by application #1 in FIG. 12A, and the display 160 displays the limit of the use of the location information by application #1, application #2, and application #3 in FIG. 12B.

According to an embodiment, when the display 160 is turned off, the processor 120 of the electronic device 101 may inform the user of the limit of the use of the location information by the application included in the application list through, for example, the notification window 1201 or 1202. According to an embodiment, when the display 160 is turned on, the notification window 1201 or 1202 may be displayed in, for example, a popup message form through the display 160. Further, when the display 160 is turned on, the limit of the use of the location information by the application may be provided to the user through a notification displayed on the display 160.

According to an embodiment, the user may be informed of the limit of the use of the location information by the application as the limit of the use of the location is displayed through an LED included in the electronic device 101 or output in a sound form (for example, notification voice or beep) through a speaker (for example, the speaker 282). According to an embodiment, the processor 120 may display, through the display 160, a user interface (UI) that provides information on an application which is included in the application list and by which the use of the location information is managed.

According to another embodiment, the processor 120 may display a battery capacity and a resource amount which are saved through the limit of the use of the location information by the application by displaying, for example, a popup window, a notification, or a UI, or outputting a sound.

In accordance with another aspect of the present disclosure, a computer-readable recording medium having a program recorded therein to perform a method for managing one or more applications of an electronic device is provided. The method includes: executing a first application program, acquiring a location information request from the first application program, determining whether to respond to the location information request at least partially based on a state of the display or information related to the first application program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for managing one or more application programs, the electronic device comprising:
    a display;
    a location measurement apparatus;
    a communication interface;
    a memory configured to store at least one application program; and
    at least one processor, electrically connected to the display, the location measurement apparatus, the communication interface, and the memory,
    wherein the at least one processor is configured to:
        execute an application program,
        acquire a location information request from the application program,
        while the display is turned on and the application program is executed in foreground, control the location measurement apparatus to:
            generate first location information including a current location of the electronic device, and
            provide the first location information to the application program,
        determine whether to provide second location information pre-stored in the memory to the application program based on the application program being executed in background and the display being turned off,
        update a shared application list based on the determining, and
        provide the second location information to the application program based on whether the application program is registered in the shared application list.

2. The electronic device of claim 1, wherein, the location measurement apparatus is not executed in response to the location information request based on the application program being executed in background and the display being turned off.

3. The electronic device of claim 1,
wherein the memory is further configured to store the shared application list for the at least one application program.

4. The electronic device of claim 1, wherein the location measurement apparatus comprises a global navigation satellite system (GNSS) apparatus or a network location provider (NLP) apparatus.

5. A method for managing one or more application programs of an electronic device, the method comprising:
executing, by at least one processor of the electronic device, an application program;
acquiring, by the at least one processor, a location information request from the application program;
while a display of the electronic device is turned on and the application program is executed in foreground:
generating, by a location measurement apparatus of the electronic device, first location information including a current location of the electronic device, and
providing the first location information to the application program;
determining to provide, to the application program, second location information pre-stored in a memory of the electronic device, based on the application program being executed in background and the display being turned off;
updating a shared application list based on the determining; and
providing the second location information to the application program based on whether the application program is registered in the shared application list.

6. The method of claim 5,
wherein the location measurement apparatus is not executed in response to the location information request, based on the application program being executed in background and the display being turned off.

7. The method of claim 5, further comprising:
determining, by the at least one processor, whether the application program is registered in the shared application list for at least one application program; and
when the application program is registered in the shared application list pre-stored in the electronic device, providing, by the at least one processor, the second location information to the application program.

8. The method of claim 5, wherein the location measurement apparatus comprises a global navigation satellite system (GNSS) apparatus or a network location provider (NLP) apparatus.

9. At least one non-transitory computer-readable recording medium having a program recorded therein to perform a method of managing one or more application programs by an electronic device, the method comprising:
executing, by at least one processor of the electronic device, an application program of the electronic device;
acquiring, by the at least one processor, a location information request from the application program;
while a display of the electronic device is turned on and the application program is executed in foreground:
generating, by a location measurement apparatus of the electronic device, first location information including a current location of the electronic device, and
providing the first location information to the application program;
determining to provide, to the application program, second location information pre-stored in a memory of the electronic device, based on the application program being executed in background and the display being turned off;
updating a shared application list based on the determining; and
providing the second location information to the application program based on whether the application program is registered in the shared application list.

* * * * *